US009905274B1

(12) United States Patent
Cho et al.

(10) Patent No.: US 9,905,274 B1
(45) Date of Patent: Feb. 27, 2018

(54) FLEXIBLE HEAT EXCHANGING MECHANISM

(71) Applicant: DELL PRODUCTS, LP, Round Rock, TX (US)

(72) Inventors: Shih-Huai Cho, New Taipei (TW); Yu-Hung Wang, Tainan (TW); Chi-Feng Lee, Taipei (TW)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/498,093

(22) Filed: Apr. 26, 2017

(51) Int. Cl.
*G11B 33/14* (2006.01)
*G11B 33/06* (2006.01)

(52) U.S. Cl.
CPC .......... *G11B 33/1426* (2013.01); *G11B 33/06* (2013.01); *G11B 33/142* (2013.01); *G11B 33/1493* (2013.01)

(58) Field of Classification Search
None
See application file for complete search history.

(56) References Cited

U.S. PATENT DOCUMENTS

| | | | | |
|---|---|---|---|---|
| 4,845,590 A * | 7/1989 | Mikolajczak | ....... | H01L 23/4093 165/80.3 |
| 4,891,735 A * | 1/1990 | Mikolajczak | ....... | H01L 23/4093 257/E23.086 |
| 4,922,601 A * | 5/1990 | Mikolajczak | ....... | H01L 23/4093 257/E23.086 |
| 4,923,179 A * | 5/1990 | Mikolajczak | ....... | H01L 23/4093 165/80.3 |
| 5,274,193 A * | 12/1993 | Bailey | ................. | H01L 23/4093 165/80.3 |
| 5,344,113 A * | 9/1994 | Jurek | ................... | H05K 7/2049 248/316.7 |
| 5,594,624 A * | 1/1997 | Clemens | ............. | H01L 23/4093 174/16.3 |
| 6,049,469 A * | 4/2000 | Hood, III | ................ | G06F 1/182 174/388 |
| 6,583,986 B1 * | 6/2003 | Storti | ..................... | H05K 5/026 165/185 |
| 6,958,914 B2 | 10/2005 | Hoss | | |
| 7,327,577 B2 * | 2/2008 | Gilliland | ............... | H01L 23/552 257/706 |
| 7,564,690 B2 * | 7/2009 | Gilliland | ............... | H01L 23/552 257/706 |
| 8,238,102 B2 * | 8/2012 | Wei | ........................ | H01L 23/36 361/679.54 |
| 8,270,162 B2 * | 9/2012 | Peng | .................... | H05K 9/0041 165/185 |

(Continued)

*Primary Examiner* — Will J Klimowicz
(74) *Attorney, Agent, or Firm* — Larson Newman, LLP

(57) ABSTRACT

An information handling system includes a hard disk drive, a handle in physical communication with the hard disk drive, and a first flexible heat sink component. The first flexible heat sink component includes a first surface contact portion, a first main portion, and a first plurality of fins. The first surface contact portion is in physical communication with the hard disk drive. The first main portion is in physical communication with the handle. The first fins extend away from the first main portion. The first fins flex downward toward the hard disk drive when the first fins are placed in physical communication with a cover of a storage sled, and the first fins fit within a space between the cover and the hard disk.

20 Claims, 4 Drawing Sheets

(56) References Cited

U.S. PATENT DOCUMENTS

| | | | |
|---|---|---|---|
| 9,377,828 B2 | 6/2016 | Tunks et al. | |
| 9,717,158 B2 * | 7/2017 | Della Fiora | H05K 7/1487 |
| 2005/0007743 A1 * | 1/2005 | Eckblad | H01L 23/4093 |
| | | | 361/719 |
| 2007/0014085 A1 * | 1/2007 | Meserth | G06F 1/184 |
| | | | 361/679.35 |
| 2007/0030646 A1 * | 2/2007 | Hsu | G11B 25/043 |
| | | | 361/679.31 |
| 2012/0033378 A1 * | 2/2012 | Peng | H05K 9/0041 |
| | | | 361/692 |
| 2013/0258601 A1 * | 10/2013 | Qin | H05K 7/2049 |
| | | | 361/714 |

\* cited by examiner

FLEXIBLE HEAT EXCHANGING MECHANISM

FIELD OF THE DISCLOSURE

The present disclosure generally relates to information handling systems, and more particularly relates to a flexible heat exchanging mechanism.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a hard disk drive, a handle in physical communication with the hard disk drive, and a first flexible heat sink component. The first flexible heat sink component includes a first surface contact portion, a first main portion, and a first plurality of fins. The first surface contact portion is in physical communication with the hard disk drive. The first main portion is in physical communication with the handle. The first fins extend away from the first main portion. The first fins flex downward toward the hard disk drive when the first fins are placed in physical communication with a cover of a storage sled, and the first fins fit within a space between the cover and the hard disk.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
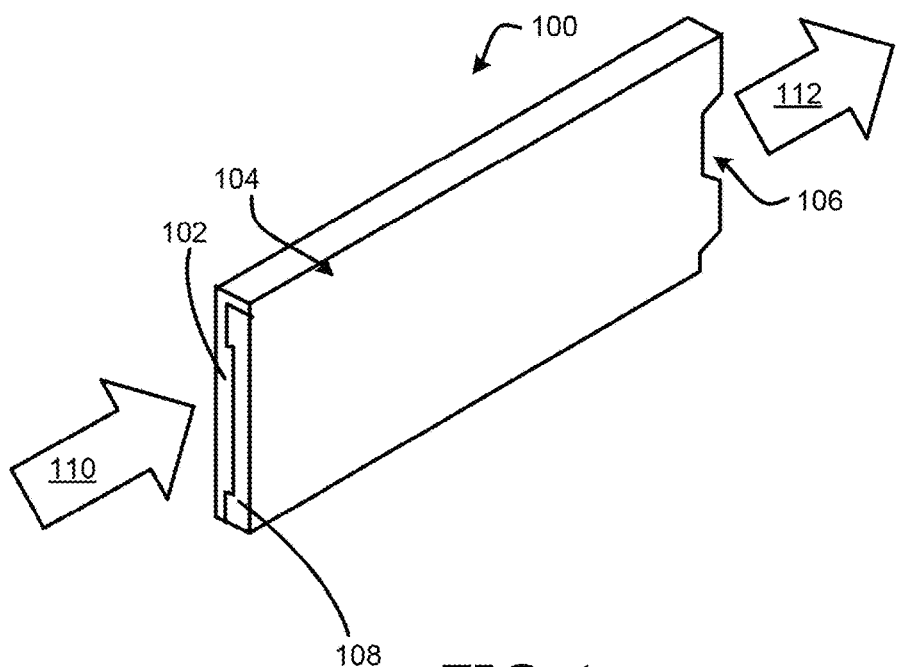
FIG. 1 is a perspective view of a storage sled of a blade server according to at least one embodiment of the present disclosure.
Figure 2:
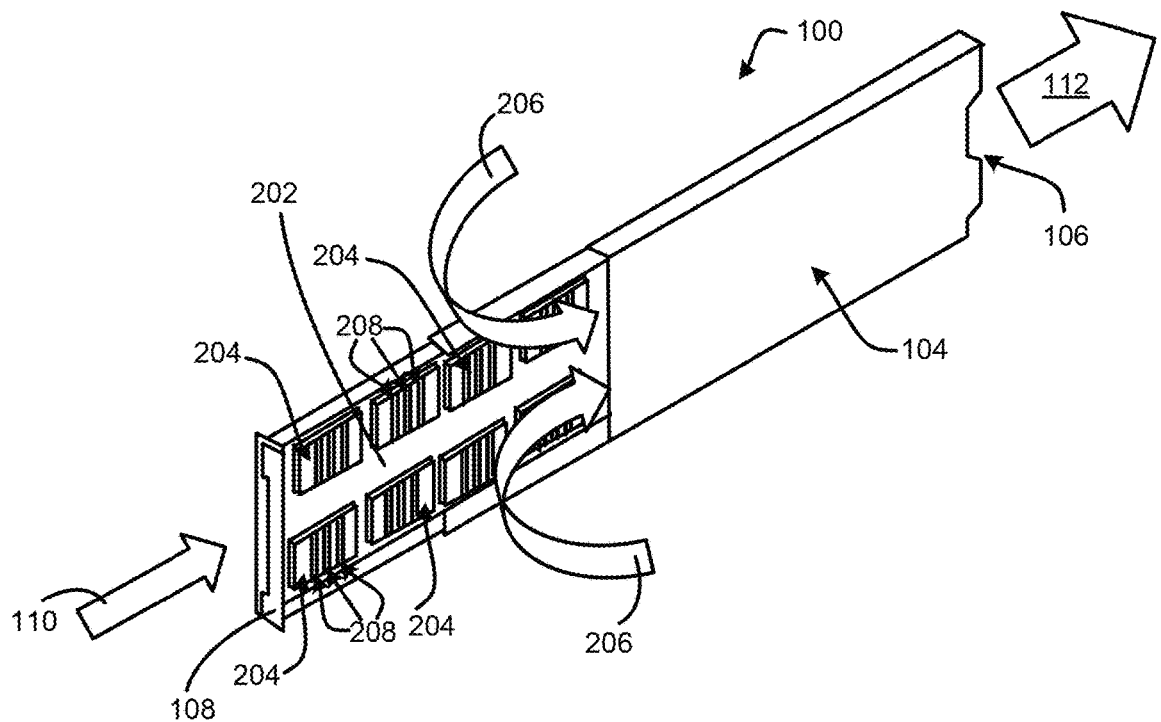
FIG. 2 is another perspective view of the storage sled according to at least one embodiment of the present disclosure.

FIGS. 1 and 2 show a storage sled 100 for a blade server of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The storage sled 100 includes a front panel 102, a cover 104, and a rear panel 106. The front panel 102 includes an airflow inlet 108. While the storage sled 100 is closed, as shown in FIG. 1, air can enter into the storage sled 100 via the airflow inlet 108 as shown by arrow 110. The airflow through the storage sled 100 can remove heat from the components within the storage sled 100, and the airflow can then exit the storage sled 100 via the back panel 106 as shown by arrow 112.

The storage sled can be opened by a tray 202 being pulled from the cover 104 as shown in FIG. 2. Multiple hard disk drives 204 can be mounted on the tray 202, and can communicate with other components within the blade server. The airflow through the storage sled 100 can cool the hard disk drives 204 while the tray 202 is closed within the cover 104. However, while tray 202 of the storage sled 100 is pulled out of the cover 104, the thermal dissipation of the hard disk drives 204 by airflow can be reduced by airflow bypass as shown by arrows 206. The airflow bypass can reduce the amount of airflow through the airflow inlet 106. The hard disk drives 204 can continue to operate while the tray 202 is extended from the cover 104, and the hard disk drives 204 can continue to produce heat that should be dissipated. In an embodiment, the tray 202 is extended from the cover 104 while the hard disk drives 204 are being serviced.

Each of the hard disk drives 204 can include multiple flexible heat sink components 208, which can provide additional thermal dissipation to the hard disk drives 204, even while the airflow bypasses the hard disk drives 204 as represented by arrows 206. Thus, the flexible heat sink components 208 can increase the thermal dissipation for the hard disk drives 204 while the tray 202 is extended from the cover 104. In an embodiment, a distance between a top of the hard disk drives 204 and the cover 104 can limit the size and shape of the flexible heat sink components 208 as will be described with respect to FIGS. 3-6 below.

Figure 3:
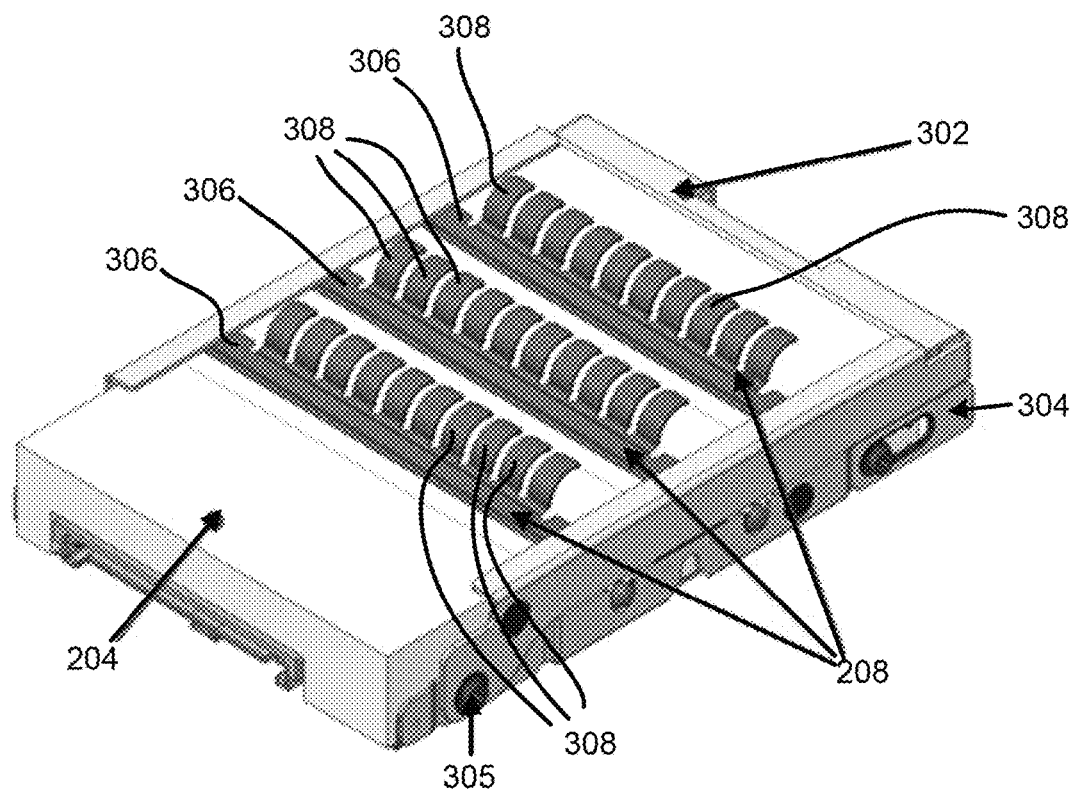
FIG. 3 is a perspective view of a hard disk drive with multiple flexible heat sink components according to at least one embodiment of the present disclosure.

FIG. 3 illustrates a hard disk drive 204 with multiple flexible heat sink components 208 according to at least one embodiment of the present disclosure. The hard disk drive 204 includes a handle 302 and a holder 304. In an embodiment, the handle 302 can be connected to the holder 304 via holding pins 305. The handle 302 can rotate around the holding pins 305 to move away from the holder 304 so that the hard disk drive 204 can be placed within the holder 304. When the hard disk drive 204 is placed within the holder 304, the handle 302 can then rotate around the holding pin 305 to close over and secure the hard disk drive 204 within the holder 304 on the tray 202.

The handle 304 includes multiple flexible heat sink components 208, and the handle 304 can hold the flexible heat sink components 208 in physical communication with the hard disk drive 204. In an embodiment, each of the flexible heat sink components 208 can include a main portion 306 and multiple fins 308. The main portion 306 and the fins 308 can increase the surface area for heat dissipation of the hard disk drive 204 as shown in FIG. 4.

Figure 4:
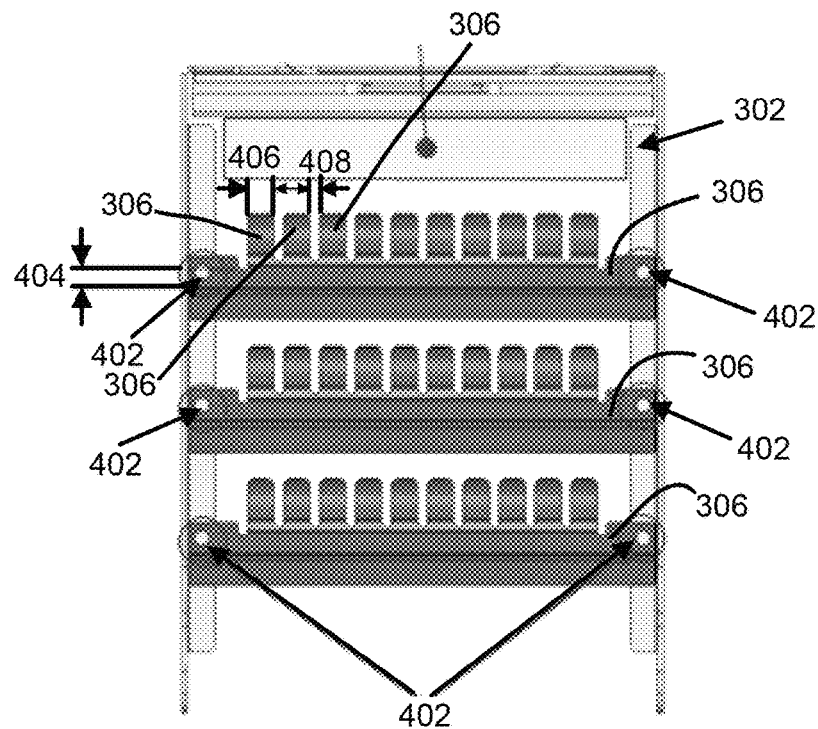
FIG. 4 is a front view of a handle of the hard disk drive and the flexible heat sink components according to at least one embodiment of the present disclosure.

FIG. 4 illustrates a bottom view of the handle 302 and the flexible heat sink components 208 according to at least one embodiment of the present disclosure. Each of the flexible heat sink components 208 are securely fastened to the handle 302 at connection points 402. For example, each flexible heat sink component 208 is connected to a first side of the handle 302 at a first end of the main portion 306 via a first connection point 402, the flexible heat sink component 208 is also connected to a second side of the handle 302 at a second end of the main portion 306 via a second connection point 402.

In an embodiment, the dimensions of the main portion 306 and the fins 308 can affect the surface area of the hard disk drive available as a heat exchanging area. The dimensions of the hard disk drive 204 and the flexible heat sink component 208 can be different values without varying from the scope of discloses. However, for clarity only a specific set of dimensions will be discussed. In an embodiment, the surface area of the hard disk drive 204 can be 7000 mm$^2$. The main portion 306 can have a width 404, such as 2.91 mm, each fin 308 can have a width 406, such as 4 mm, and each fin 308 can be separated from one another by a width 406, such as 1.5 mm. In an embodiment, the surface area of the main portion 306 and the fins 308 for each of the flexible heat sink components 208 can equal a specific amount, such as 2400 mm$^2$. This surface area can be added to the surface area of the hard disk drive 204 for a total surface area of 9400 mm$^2$, which is about a 34% increase in surface area over just 7000 mm$^2$ for just the hard disk drive 204. Thus, in an embodiment, the flexible heat sink components 208 can increase the heat exchanger area by around 34% when the tray 202 is extended from the cover 104, and this added area can extend the service time of the storage sled 100 by keeping the temperature of the hard disk drives 204 below a shutdown level for an extended amount of time as compared to the hard disk drives 204 not having the flexible heat sink components 208.

Figure 5:
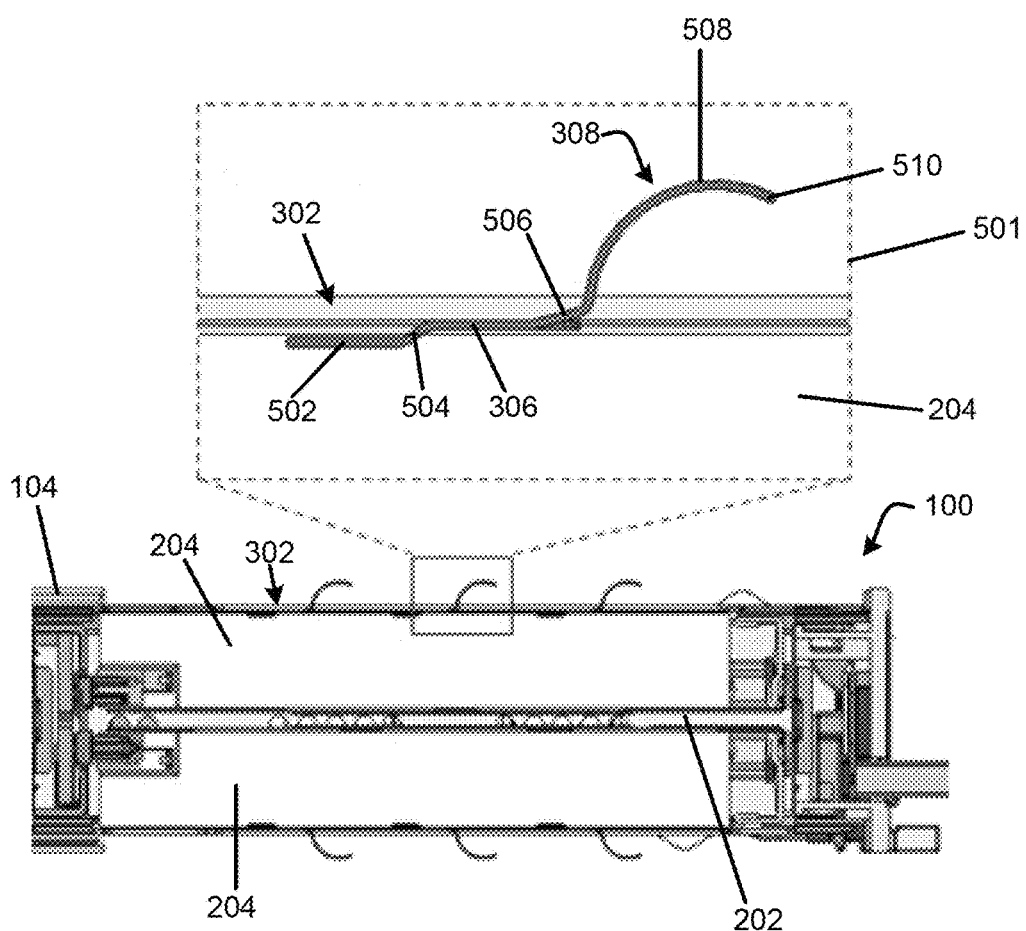
FIG. 5 is a cross-sectional view of the storage sled when a tray is extended according to at least one embodiment of the present disclosure.
Figure 6:
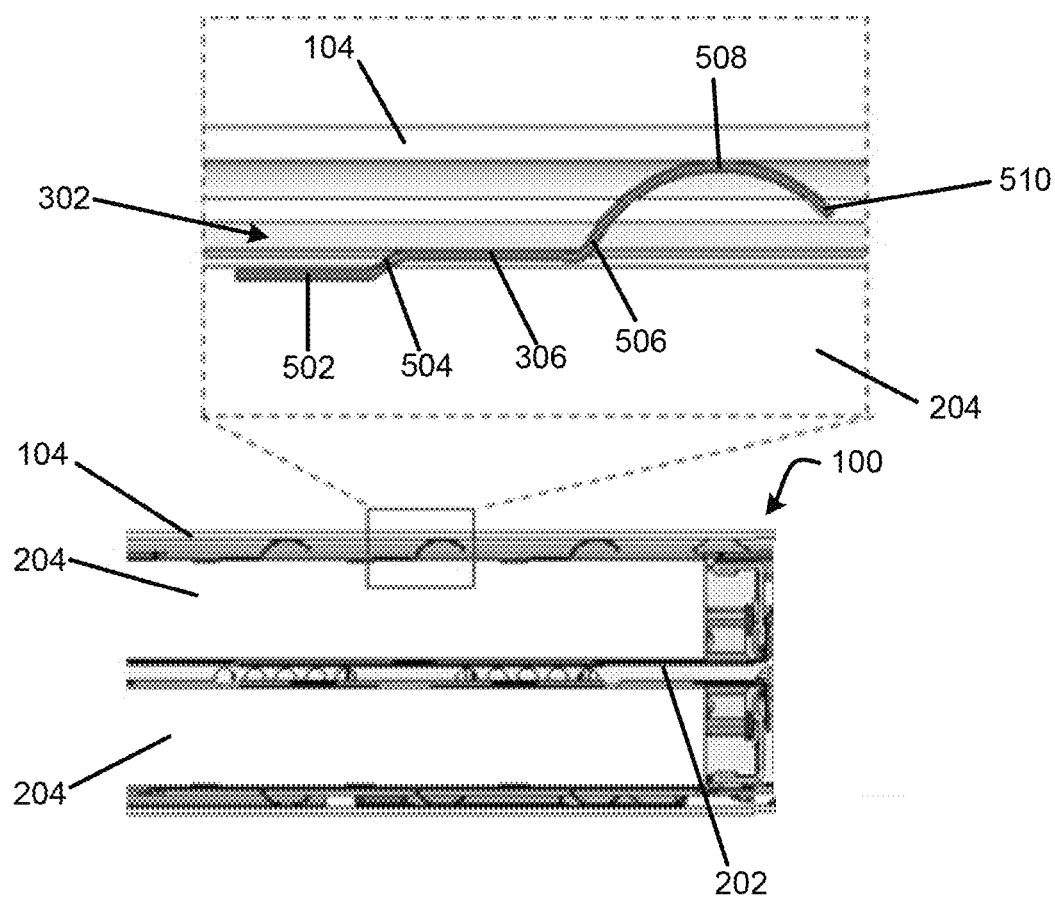
FIG. 6 is a cross-sectional view of the storage sled when the tray is closed according to at least one embodiment of the present disclosure.

FIG. 5 illustrates a cross-sectional view of the storage sled 100 when the tray 202 is extended from the cover 104 according to at least one embodiment of the present disclosure. FIG. 6 illustrates a cross-sectional view of the storage sled 100 when the tray 202 is closed within the cover 104 according to at least one embodiment of the present disclosure. In an embodiment, the tray 202 can include a hard disk drive 204 on each side of the tray 202 as shown in FIG. 5. The enlarged portion 501 includes a flexible heat sink component 208 in greater detail. The flexible heat sink component 208 includes a surface contact portion 502 connected to the main portion 306 via a first angled portion 504, and the fin 308 connected to the main portion 306 via a second angled portion 506. The fin 308 includes a rounded portion 508 and a tip 510.

In an embodiment, the surface contact portion 502 is located in between the handle 302 and the hard disk drive 204 to remove heat from the hard disk drive 204. The angled portion 504 of the heat sink component 208 angles away from the hard disk drive 204 and connects to the main portion 306. As described above, the main portion 306 is attached to the handle 302. The angled portion 506 of the heat sink component 208 angles away from the handle 302 and connects to the fin 308, which in turn continues to extend away from the handle 302 until the rounded portion 508 transitions into the tip 510. In an embodiment, the fin 308 is flexible, such that the rounded portion 508 can bend downward toward the hard disk drive 204 until the fin 308 can fit within the space between the cover 104 and the hard disk drive 204 as shown in the enlarged portion 602 of FIG. 6.

As the tray 202 is pushed within the cover 104, round portion of the fins 308 of the heat sink components 208 can be placed in physical communication with the cover 104, which in turn can cause the fins 308 to flex downward toward the hard disk drives 204 until the fins 308 fit within the space in between the cover 104 and the hard disk drive 204. Alternatively, when the tray 202 is pulled from within the cover 104, as shown in FIG. 5, the fins 308 can snap up and away from the hard disk drive 204 into an extended position to increase the heat exchange surface area. In an embodiment, the heat sink components 208 can be composed of a material that provides electromagnetic interference shielding to the hard disk drives 204 when the tray 202 is closed within the cover 104. Thus, the heat sink components 208 can prevent electromagnetic interference from affecting the hard disk drive 204.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a hard disk drive;
   a handle in physical communication with the hard disk drive; and
   a first flexible heat sink component, the first flexible heat sink component including:
      a first surface contact portion in physical communication with the hard disk drive;
      a first main portion in physical communication with the handle; and
      a first plurality of fins extending away from the first main portion, wherein the first fins flex downward toward the hard disk drive when the first fins are placed in physical communication with a cover of a storage sled, wherein the first fins fit within a space between the cover and the hard disk.

2. The information handling system of claim 1 further comprising a second flexible heat sink component, the second flexible heat sink component including:
   a second surface contact portion in physical communication with the hard disk drive;
   a second main portion in physical communication with the handle; and
   a second plurality of fins extending away from the second main portion, wherein the second fins flex downward toward the hard disk drive when the second fins are placed in physical communication with the cover of the storage sled, wherein the second fins fit within the space between the cover and the hard disk.

3. The information handling system of claim 2 wherein the first and second flexible heat sink components provide electromagnetic interference shielding for the hard disk drive.

4. The information handling system of claim 1 wherein the first flexible heat sink component removes heat from the hard disk drive while the hard disk drive is being serviced.

5. The information handling system of claim 1 wherein the fins snap up to an extended position when the hard disk drive is pulled from within the cover.

6. The information handling system of claim 1 wherein each of the fins includes a rounded portion and a tip, wherein each of the fins flex at the rounded portion.

7. A storage sled comprising:
a cover;
a tray configured to extend from within the cover;
a hard disk drive in physical communication with the tray;
a handle in physical communication with the hard disk drive; and
a first flexible heat sink component, the first flexible heat sink component including:
  a first surface contact portion in physical communication with the hard disk drive;
  a first main portion in physical communication with the handle; and
  a first plurality of fins extending away from the first main portion, wherein the first fins flex downward toward the hard disk drive when the first fins are placed in physical communication with the cover, wherein the first fins fit within a space between the cover and the hard disk.

8. The storage sled of claim 7 further comprising a second flexible heat sink component, the second flexible heat sink component including:
  a second surface contact portion in physical communication with the hard disk drive;
  a second main portion in physical communication with the handle; and
  a second plurality of fins extending away from the second main portion, wherein the second fins flex downward toward the hard disk drive when the second fins are placed in physical communication with the cover of the storage sled, wherein the second fins fit within the space between the cover and the hard disk.

9. The storage sled of claim 8 wherein the first and second flexible heat sink components provide electromagnetic interference shielding for the hard disk drive.

10. The storage sled of claim 7 wherein the tray includes a front panel having an air inlet to enable airflow through the storage sled while the tray is closed within the cover, and a back panel to enable the airflow to leave the storage sled.

11. The storage sled of claim 7 wherein the first flexible heat sink component removes heat from the hard disk drive while the hard disk drive is being serviced.

12. The storage sled of claim 7 wherein the fins snap up to an extended position when the tray is pulled from within the cover.

13. The storage sled of claim 7 wherein each of the fins includes a rounded portion and a tip, wherein each of the fins flex at the rounded portion.

14. A storage sled comprising:
a cover;
a tray configured to extend from within the cover, the tray including a front panel having an air inlet to enable airflow through the storage sled while the tray is closed within the cover;
a hard disk drive in physical communication with the tray;
a handle in physical communication with the hard disk drive; and
a first flexible heat sink component, the first flexible heat sink component including:
  a first surface contact portion in physical communication with the hard disk drive;
  a first main portion in physical communication with the handle; and
  a first plurality of fins extending away from the first main portion, wherein the first fins flex downward toward the hard disk drive when the first fins are placed in physical communication with the cover, wherein the first fins fit within a space between the cover and the hard disk.

15. The storage sled of claim 14 further comprising a second flexible heat sink component, the second flexible heat sink component including:
  a second surface contact portion in physical communication with the hard disk drive;
  a second main portion in physical communication with the handle; and
  a second plurality of fins extending away from the second main portion, wherein the second fins flex downward toward the hard disk drive when the second fins are placed in physical communication with the cover of the storage sled, wherein the second fins fit within the space between the cover and the hard disk.

16. The storage sled of claim 15 wherein the first and second flexible heat sink components provide electromagnetic interference shielding for the hard disk drive.

17. The storage sled of claim 14 wherein a bypass airflow bypasses the air inlet in response to the tray being extended from the cover.

18. The storage sled of claim 14 wherein the first flexible heat sink component removes heat from the hard disk drive while the hard disk drive is being serviced.

19. The storage sled of claim 14 wherein the fins snap up to an extended position when the tray is pulled from within the cover.

20. The storage sled of claim 14 wherein each of the fins includes a rounded portion and a tip, wherein each of the fins flex at the rounded portion.

* * * * *